United States Patent
Fukutomi et al.

(10) Patent No.: US 10,124,329 B2
(45) Date of Patent: Nov. 13, 2018

(54) OIL DEGRADATION SUPPRESSOR

(71) Applicants: TOYOTA JIDOSHA KABUSHIKI KAISHA, Toyota-shi, Aichi (JP); TOYOTA BOSHOKU CORPORATION, Kariya-shi, Aichi (JP)

(72) Inventors: Ippei Fukutomi, Machida (JP); Motoichi Murakami, Gotenba (JP); Hideto Morishita, Gifu (JP); Yasuhiro Saito, Tokoname (JP)

(73) Assignees: TOYOTA BOSHOKU CORPORATION, Kariya-shi (JP); TOYOTA JIDOSHA KABUSHIKI KAISHA, Toyota-shi (JP)

(*) Notice: Subject to any disclaimer, the term of this patent is extended or adjusted under 35 U.S.C. 154(b) by 495 days.

(21) Appl. No.: 14/780,629

(22) PCT Filed: Mar. 18, 2014

(86) PCT No.: PCT/JP2014/001562
§ 371 (c)(1),
(2) Date: Sep. 28, 2015

(87) PCT Pub. No.: WO2014/174756
PCT Pub. Date: Oct. 30, 2014

(65) Prior Publication Data
US 2016/0038930 A1 Feb. 11, 2016

(30) Foreign Application Priority Data
Apr. 23, 2013 (JP) .................. 2013-090338

(51) Int. Cl.
*B01J 20/00* (2006.01)
*B01J 41/10* (2006.01)
(Continued)

(52) U.S. Cl.
CPC .............. *B01J 41/10* (2013.01); *B01D 15/00* (2013.01); *B01J 20/265* (2013.01);
(Continued)

(58) Field of Classification Search
CPC .... B01J 41/10; B01J 20/28047; B01J 20/265; C10G 25/02; C10G 31/09; C10G 25/003;
(Continued)

(56) References Cited

U.S. PATENT DOCUMENTS

| | | |
|---|---|---|
| 5,932,104 A | 8/1999 | Kawamura |
| 2005/0019236 A1* | 1/2005 | Martin .................. B01D 35/30 |
| | | 422/255 |
| 2009/0005478 A1* | 1/2009 | Gelbin .................... C08K 5/13 |
| | | 524/186 |

FOREIGN PATENT DOCUMENTS

| | | |
|---|---|---|
| EP | 0773058 A1 | 5/1997 |
| JP | H03-296408 A | 12/1991 |

(Continued)

OTHER PUBLICATIONS

Masayoshi Watanabe, "The characteristics of solvent and gel composed of polymer and ionic liquid", Polymer Frontier 21 Koen Yoshishu vol. 2007, No. 3 (2007), pp. 11 to 14.
(Continued)

*Primary Examiner* — Taiwo Oladapo
(74) *Attorney, Agent, or Firm* — Hunton Andrews Kurth LLP

(57) ABSTRACT

An oil degradation suppressor according to one aspect of the present invention contains a reactant having an ability to adsorb a given component in an oil such as an acidic anion, and a gel-like material to hold the reactant. The reactant is preferably a hydrotalcite-like compound. The gel-like material contains a highly heat resistive gel and an amphiphilic solvent. A gel-like member containing the reactant and the (Continued)

gel-like material is disposed in a casing, and thereby an oil filter is provided. The gel-like material can work for supporting the reactant suitably.

5 Claims, 11 Drawing Sheets

(51) Int. Cl.
*B01D 15/00* (2006.01)
*C10G 25/00* (2006.01)
*F01M 1/10* (2006.01)
*C10G 25/02* (2006.01)
*C10G 31/09* (2006.01)
*B01J 20/26* (2006.01)
*B01J 20/28* (2006.01)

(52) U.S. Cl.
CPC ...... *B01J 20/28047* (2013.01); *C10G 25/003* (2013.01); *C10G 25/02* (2013.01); *C10G 31/09* (2013.01); *F01M 1/10* (2013.01); *F01M 2001/1007* (2013.01)

(58) Field of Classification Search
CPC ... F01M 1/10; F01M 2001/1007; B01D 15/00
See application file for complete search history.

(56) References Cited

FOREIGN PATENT DOCUMENTS

| JP | H09-136022 A | 5/1997 |
|---|---|---|
| JP | 2003-532536 A | 11/2003 |
| JP | 2013-147611 A | 8/2013 |
| WO | 01/85882 A2 | 11/2001 |
| WO | 2012/140699 A1 | 10/2012 |

OTHER PUBLICATIONS

W-F Lee et al., "Effect of hydrotalcite on the physical properties and drug-release behavior of nanocomposite hydrogels based on poly[acrylic acid-co-poly(ethylene glycol) methyl ether acrylate] gels," Journal of Applied Polymer Science, vol. 94, No. 2, Oct. 15, 2004, pp. 692-699, (EESR Feb. 29, 2016).

* cited by examiner

OIL DEGRADATION SUPPRESSOR

CROSS-REFERENCE TO RELATED APPLICATIONS

This is a national phase application based on the PCT International Patent Application No. PCT/JP2014/001562 filed Mar. 18, 2014, claiming priority to Japanese Patent Application No. 2013-090338 filed Apr. 23, 2013, the entire contents of both of which are incorporated herein by reference.

TECHNICAL FIELD

The present invention relates to an oil degradation suppressor which can be used in machines such as an internal combustion engine.

BACKGROUND ART

In machines such as an internal combustion engine, an oil filter is used to suppress the degradation of oil. Patent Literature 1 discloses a filter medium for a bypass oil filter used in the internal combustion engine. The filter medium contains a hydrotalcite-like compound (hydrotalcite-type compound) represented by the following formula (1). According to the description of Patent Literature 1, fine particles such as the hydrotalcite-like compound have adsorbing ability of acids, alkalis to adsorb acidic substances generated in the internal combustion engine, and thus have a role to protect the oil from degradation.

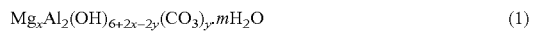

$$Mg_xAl_2(OH)_{6+2x-2y}(CO_3)_y \cdot mH_2O \quad (1)$$

wherein in the formula (1), x and y are integers which satisfy $3<x<20$, $0<y<2$, respectively, and m represents an integer.

CITATION LIST

Patent Literature

PTL 1: Japanese Patent Laid-Open No. H03-296408 (1991)

SUMMARY OF INVENTION

Technical Problem

In the oil filter which is one of the oil degradation suppressors, a reactant such as the hydrotalcite-like compound can be used by carrying an unwoven fabric, or the like. However, in such a case since the reactant is merely held on mainly by a mechanical action, there is a possibility that the reactant moves in the oil filter (flowing to the downstream) to be agglomerated, and thereby, the aforementioned adsorption effect of the hydrotalcite may be lowered.

The present invention has been made in view of the above viewpoints, and has an object to provide an oil degradation suppressor which can hold a reactant such as the hydrotalcite-like compound therein more firmly.

Solution to Problem

According to one aspect of the present invention, there is provided an oil degradation suppressor containing;

a reactant which has an ability to adsorb certain components in an oil; and a gel-like material for holding the reactant and comprising a highly heat resistive gel and an amphiphilic solvent.

For example, the oil degradation suppressor may include:
a casing, and
a filter member arranged in the casing, wherein
the filter member may be able to comprise a gel-like member containing the reactant and the gel-like material.

Preferably, the highly heat resistive gel is a reaction product of polydimethylaminoethyl methacrylate and a diamine compound which contains a fluorinated alkylsulfonyl group.

Preferably, the amphiphilic solvent is at least one selected from the group consisting of triethylene glycol dimethyl ether, diethylene glycol monomethyl ether, dipropylene glycol dimethyl ether, diethylene glycol dibutyl ether, diethylene glycol butyl methyl ether, diethylene glycol dimethyl ether, diethylene glycol ethyl methyl ether, dipropylene glycol monomethyl ether, diethylene glycol diethyl ether, tripropylene glycol dimethyl ether, diethylene glycol monobutyl ether, ethylene glycol monophenyl ether, triethylene glycol monomethyl ether, triethylene glycol butyl methyl ether, polyethylene glycol dimethyl ether, tetraethylene glycol dimethyl ether, polyethylene glycol monomethyl ether, and an ionic liquid.

Preferably, the diamine compound which contains the fluorinated alkylsulfonyl group is N,N,N',N'-tetra(trifluoromethanesulfonyl)hexane-1,6-diamine, or N,N,N',N'-tetra(trifluoromethanesulfonyl)octane-1,12-diamine.

Preferably, the ionic liquid is a compound which comprises:

at least one cation selected from the group consisting of a 1-alkyl-3-methylimidazolium, a N-alkylpyridinium, a tetraalkylammonium, and a tetraalkylphosphonium, and at least one anion selected from the group consisting of $[PF_4]^-$, $[(CF_3SO_2)_2N]^-$, $[BR_1R_2R_3R_4]^-$, $[BF_4]^-$, $[CF_3SO_3]^-$, $[CH_3CO_2]^-$, $[CF_3CO_2]^-$, $[NO_3]^-$, $Br^-$, $Cl^-$, $I^-$, $[Al_3Cl_2]^-$, and $[AlCl_4]^-$.

Preferably, each oil degradation suppressor comprises a hydrotalcite-like compound as the reactant.

DESCRIPTION OF EMBODIMENTS

In the following, the embodiments of the present invention are explained. The oil degradation suppressor according to the embodiment of the present invention which is explained below is an oil filter which is disposed in the oil flow path (oil path) in the machines such as the internal combustion engine, and hereinafter is simply referred to as an oil filter. However, the oil degradation suppressor is not limited to the oil filter. The following embodiment is a simple example of the present invention and a person skilled in the art can change design optionally.

(First Embodiment)

Figure 1:
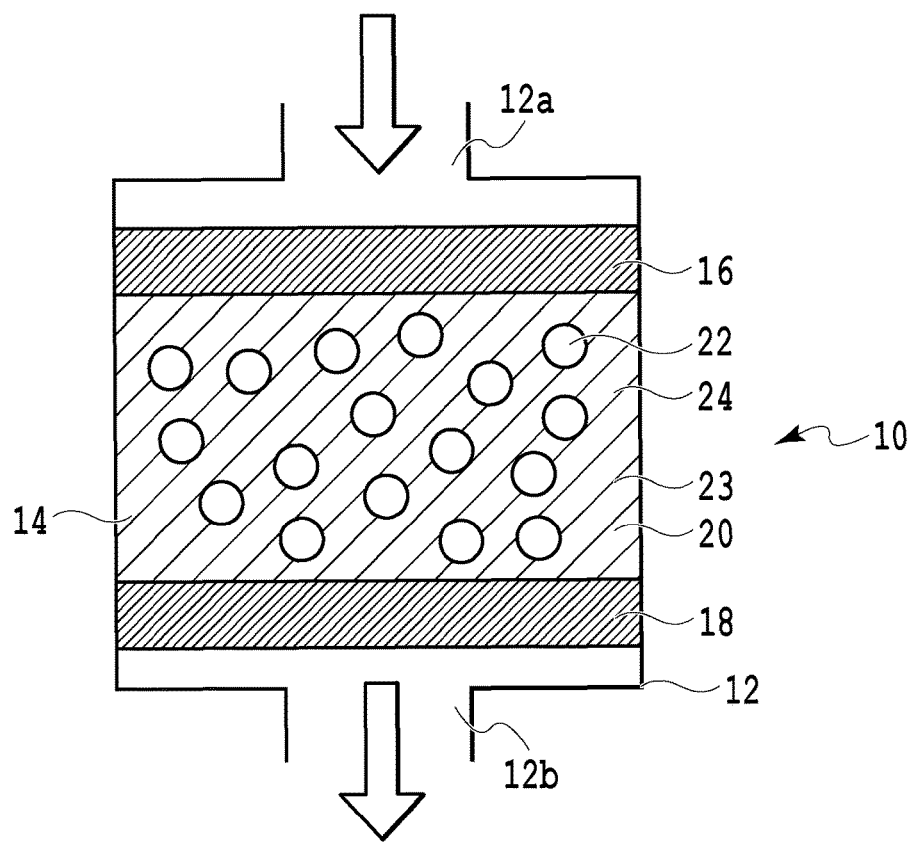
FIG. 1 is a schematic view of an oil filter according to a first embodiment of the present invention.

An oil filter 10 according to the first embodiment of the present invention is schematically shown in FIG. 1. In FIG. 1, the flow direction of the oil is represented by an arrow. In the oil filter 10, there is employed a dead-end filtration system.

The oil filter 10 is disposed in the oil path of the internal combustion engine (hereinafter referred to as engine) not shown. The oil filter 10 includes a casing 12 of the oil filter, and a filter member 14 as a filter medium disposed in the casing. The casing 12 has an inlet port 12a and an outlet port 12b.

The filter member 14 has a first member 16, a second member 18, and a third member 20 which is sandwiched by them. Each of the first member 16 and the second member 18 is constituted as an unwoven fabric member, and is a member which is not produced by weaving fibers regularly, but is formed by entangling fibers. These first and second members 16, 18 each have the same or almost the same porosity (rate of clearance per unit volume), but may be different as a whole or partly. The first member 16 and the second member 18 are not limited to the above configuration, and may be simply configured to hold the third member 20 at the given position. For example, each of the first member 16 and the second member 18 may be produced by weaving fibers regularly.

The third member 20 is held at the given position in the casing 12 by the first member 16 and the second member 18 so as to be held between them. The third member 20 contains a reactant 22. Here, the reactant 22 is particulate. The reactant 22, however, may be in the form of various shapes such as fibrous, and the present invention would not limit the shape of the reactant. The third member 20 contains a gel-like member 24. The gel-like member 24 contains the reactant 22 and a gel-like material 23 to hold the reactant 22.

The third member 20 may be configured by the gel-like member 24 alone. Also, the filter member 14 may be configured by the third member 20 alone.

(Reactant)

The reactant 22 is a substance having an ability to adsorb a given component in an oil. In the present embodiment, the reactant 22 has particularly a function to adsorb an acidic anion in the oil.

In the oil filter 10, the hydrotalcite-like compound is used as the reactant 22.

The hydrotalcite-like compound is a layered compound which contains layers of skeleton part comprising a metallic component as a main component, and an anion component sandwiched between the layers. The hydrotalcite-like compound is one of adsorbents called an inorganic ion exchanger, and has a function to adsorb the acidic anion component in the oil and instead, to release the anion of the hydrotalcite-like compound.

Among the hydrotalcite-like compounds, between the layers of the skeleton part, there is one containing hydroxide ion (OH$^-$) and carbonate ion (CO$_3^{2-}$) which are the anion components. When the hydrotalcite-like compound is present in water or oil, the hydroxide ion and the carbonate ion can be released from the hydrotalcite-like compound in response to catching or adsorption of the anion by the hydrotalcite-like compound.

For example, such a hydrotalcite-like compound may have a composition represented by the following formula (2).

$$Mg_{8-x}Al_x(OH)_y(CO_3)_z \cdot mH_2O \qquad (2)$$

wherein, in the formula (2), x is 1 or more and 7 or less, y, z and m are positive rational numbers. Further, x is preferably 2 or more.

As the hydrotalcite-like compound which satisfies the formula (2), there is, for example, "Mg$_6$Al$_2$(OH)$_{16}$(CO$_3$)". Such a hydrotalcite-like compound is generally present in the form of hydrate, and can be represented by, for example, "Mg$_6$Al$_2$(OH)$_{16}$(CO$_3$)·mH$_2$O (m is a positive rational number)". Accordingly, the hydrotalcite-like compound where the number of the hydroxide ions is larger than the number of the carbonate ions (the hydrotalcite-like compound where, in the above formula (2), y is larger than z) can be used as the reactant 22.

Conversely, the hydrotalcite-like compound where the number of the carbonate ions is larger than the number of the hydroxide ions can also be used as the reactant 22. Such a hydrotalcite-like compound is a compound where, in the above formula (2), z is larger than y.

The present invention may include a case that the aforementioned hydrotalcite-like compound described in Patent Literature 1 can be used as the reactant 22.

The oil filter 10 according to the first embodiment of the present invention can be used for suppressing the degradation of the oil which circulates in lubrication device of engine. Therefore, when the oil filter 10 is applied to the lubrication device of engine, it is required that the reactant such as the above hydrotalcite-like compound can be resistive to a temperature of an engine oil during engine operation.

In engines, an engine oil is easily degraded early due to blowby gas. The blowby gas is a gas which leaks into a crank case from a gap between a piston ring of a piston of engine and a cylinder bore of a cylinder block. The blowby gas contains a large amount of hydrocarbons and water. Thus, when the amount of the blowby gas is too large, the blowby gas causes early degradation of the engine oil and rust in the engine. Since the blowby gas contains the hydrocarbon, it is not proper to exhaust it to atmosphere as it is from the environmental point of view. Therefore, many engines are provided with a known blowby gas circulation device (not shown), and the blowby gas is generally forced to be returned to an induction system through the inside of a head cover, and to be supplied to a combustion chamber.

Such a blowby gas contains, for example, NO$_x$, SO$_x$ and water. Further, for example, since to the engine head cover heat is difficult to be transferred from the engine, and the outer surface of the head cover is exposed to atmosphere and is cooled by cooling wind, etc., condensed water is easily generated on the inner surface of the head cover due to condensation, etc. Thus, particularly in the head cover, as a result of the reaction between them, it is easy to yield the acidic anion components such as nitrate ion and sulfate ion. The acidic anion components can be mixed with a lubricant, i.e. engine oil, and can accelerate generation, adhesion, and accumulation of a sludge precursor and sludge in the engine.

To the contrary, the hydrotalcite-like compound has the ability to adsorb the anion, and thus, can adsorb the acidic anions in the oil such as nitrate ion and sulfate ion from the oil. Therefore, the hydrotalcite-like compound can contribute to the suppression of the degradation of oil.

As the reactant 22, a hydrotalcite-like compound having other composition except the aforementioned composition can be used, and it is possible to use other compounds. Examples of the reactive substance usable as the reactant 22 include a basic compound such as calcium carbonate, sodium carbonate, magnesium carbonate, calcium hydroxide, sodium hydroxide, magnesium hydroxide, calcium oxide, magnesium oxide, zinc oxide, barium oxide, or sodium aluminate, and these basic compounds are effective to remove the above acidic substances. The reactant 22 of the oil filter 10 may be composed of one kind of the compounds among these compounds, or may be composed of plural kinds of the compounds among these compounds.

The usable reactant 22 has a particle size of 0.1 μm or more, preferable one has a particle size of 5 μm or more. Further preferable reactant 22 has a particle size of 100 to 1000 μm. This is to hold the reactant 22 easily and to ensure its reactivity.

(Gel-like Material and Gel-like Member)

The gel-like member 24 is configured carrying the reactant 22. As mentioned above, the gel-like member 24 includes the reactant 22 and the gel-like material 23 for holding the reactant 22. The gel-like material 23 is composed of a first compound and a second compound. However, since a temperature of the oil in the engine can rise to around 130° C., the gel-like member 24 can be resistive to the temperature.

Figure 2:
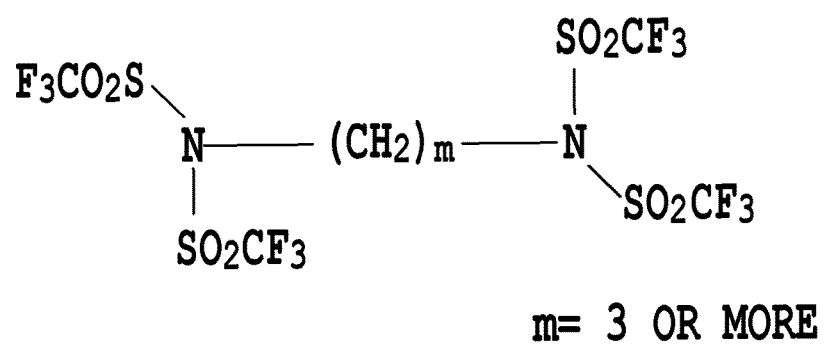
FIG. 2 is a structural formula of a compound usable in the present invention.

The first compound is a gel (namely gel-like substance), can be resistive to 150° C. (>130° C.) or more, and can be referred to as a highly heat resistive gel. The first compound is preferably a reaction product of polydimethylaminoethyl methacrylate and a diamine compound which contains a fluorinated alkylsulfonyl group. The diamine compound which contains a fluorinated alkylsulfonyl group is preferably an alkylene diamine shown in FIG. 2, more preferably N,N,N',N'-tetra(trifluoromethanesulfonyl)hexane-1,6-diamine (m=6), or N,N,N',N'-tetra(trifluoromethanesulfonyl)octane-1,12-diamine (m=12).

The second compound is an amphiphilic solvent, and for example, is an ethylene glycol ether-based solvent and an ionic liquid. The second compound preferably has a boiling point of 150° C. or more, since the temperature of the oil in the engine can rise to around 130° C.

Examples of the second compound include one or a combination of any of two or more selected from the group consisting of triethylene glycol dimethyl ether (boiling point: 216° C.), diethylene glycol monomethyl ether (boiling point: 194° C.), dipropylene glycol dimethyl ether (boiling point: 171° C.), diethylene glycol dibutyl ether (boiling point: 256° C.), diethylene glycol dimethyl ether (boiling point: 162° C.), diethylene glycol ethyl methyl ether (boiling point: 176° C.), dipropylene glycol monomethyl ether (boiling point: 188° C.), diethylene glycol diethyl ether (boiling point: 189° C.), diethylene glycol butyl methyl ether (boiling point: 212° C.), tripropylene glycol dimethyl ether (boiling point: 215° C.), diethylene glycol monobutyl ether (boiling point: 230° C.), ethylene glycol monophenyl ether (boiling point: 245° C.), triethylene glycol monomethyl ether (boiling point: 249° C.), triethylene glycol butyl methyl ether (boiling point: 261° C.), polyethylene glycol dimethyl ether (boiling point: 264 to 294° C.), tetraethylene glycol dimethyl ether (boiling point: 275° C.), and polyethylene glycol monomethyl ether (boiling point: 290 to 310° C.). Alternatively or in addition thereto, the second compound is an ionic liquid of a compound containing a given cation and a given anion. The cation is at least one selected from the group consisting of a 1-alkyl-3-methylimidazolium, an N-alkylpyridinium, a tetraalkylammonium, and a tetraalkylphosphonium. The anion is at least one selected from the group consisting of $[PF_4]^-$, $[(CF_3SO_2)_2N]^-$, $[BR_1R_2R_3R_4]^-$, $[BF_4]^-$, $[CF_3SO_3]^-$, $[CH_3CO_2]^-$, $[CF_3CO_2]^-$, $[NO_3]^-$, $Br^-$, $Cl^-$, $I^-$, $[Al_3Cl_2]^-$, and $[AlCl_4]^-$.

In the following, explanation is made with respect to preparation example of the gel-like material which carries the hydrotalcite-like compound.

Figure 3:
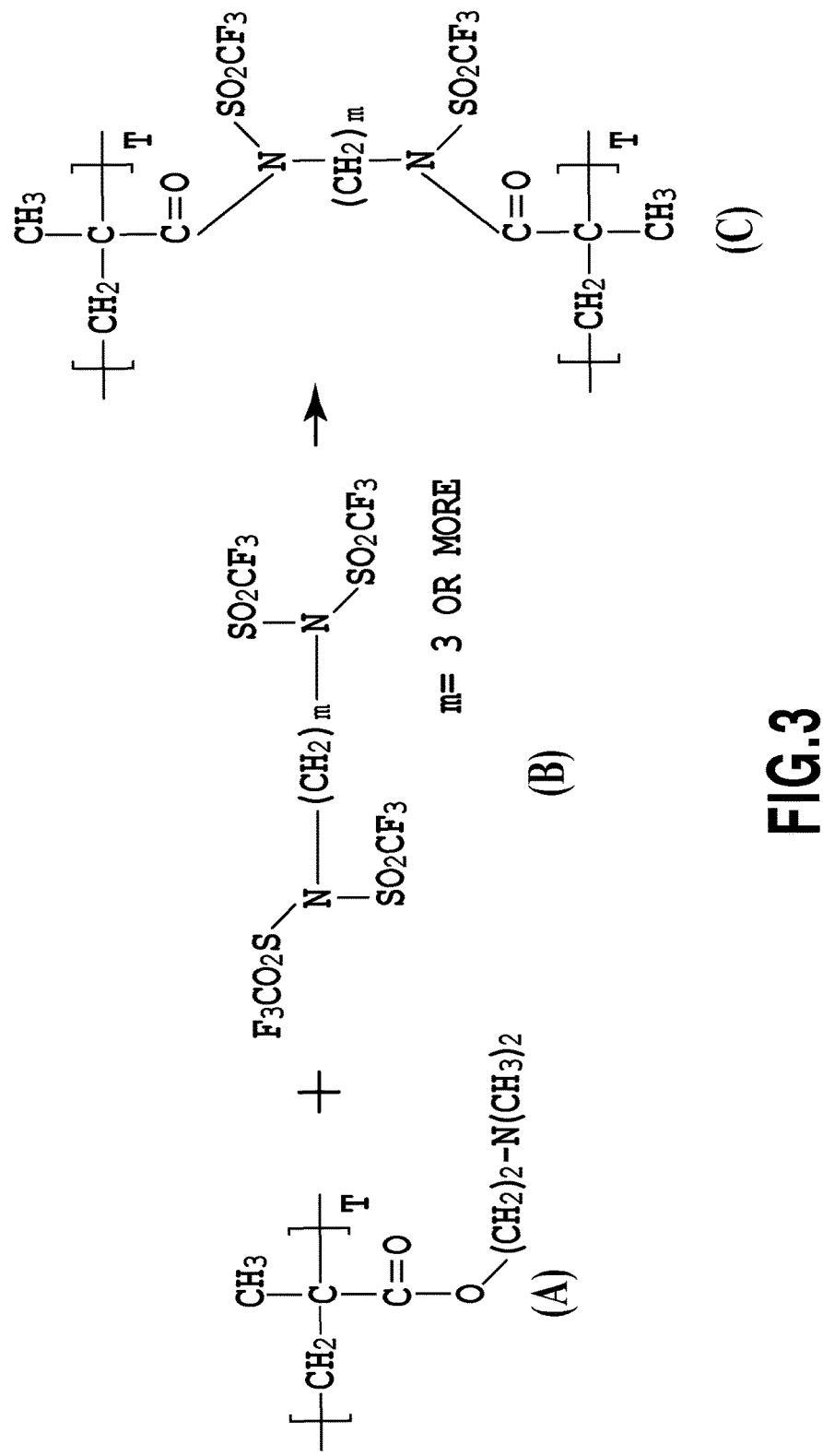
FIG. 3 is a reaction formula which represents a gel-like material as one example.

As shown in FIG. 3, explanation as to the preparation example is made by referring polydimethylaminoethyl methacrylate (compound (A)) and, the diamine compound which contains a fluorinated alkylsulfonyl group, preferably an alkylene diamine shown by the compound (b), more preferably N,N,N',N'-tetra(trifluoromethanesulfonyl)hexane-1,6-diamine (m=6), or N,N,N',N'-tetra(trifluoromethanesulfonyl)octane-1,12-diamine (m=12). In FIG. 3, as the compound (C), there is shown a cross-linked gel-like material where trifluoromethanesulfonyl group is remained, and the gel-like material can include one where those groups are further cross-linked.

In the first embodiment, for example, the compound (A) and the compound (B) are mixed in a proportion (molar ratio) of 1 to 1 in the aforementioned amphiphilic solvent with stirring or tumbling. Next, the hydrotalcite-like compound is added to the thus obtained mixed solution of the compound (A) and the compound (B). Next, by heating the mixed solution of the compound (A) and the compound (B) which contains the hydrotalcite-like compound at a given temperature (for example 85 to 95° C.), it is possible to obtain a gel-like material which carries the hydrotalcite-like compound.

In the other embodiment, a gel-like material (compound (C)) can be prepared by, for example, mixing the compound (A) and the compound (B) in a proportion (molar ratio) of 1 to 1 in the aforementioned amphiphilic solvent with stirring or tumbling. In this embodiment, in the reaction shown in FIG. 3, a proper catalyst to accelerate the reaction can be added. Next, by adding the hydrotalcite-like compound to the thus obtained solution of the gel-like material, and by further stirring or tumbling the resultant solution, it is possible to immerse the hydrotalcite-like compound into the solution of the gel-like material completely.

As explained above, the above reactant 22 is carried on (included in) the gel-like material 23 obtained on the basis of the first compound and the second compound. The gel-like material 23 can also chemically hold the reactant 22 by hydrogen bond, etc. Accordingly, the gel-like member 24 can more firmly hold the reactant 22 in comparison with the case where the reactant is simply held only by a mechanical action, and thereby the agglomeration of the reactant 22 can be inhibited.

Since the reactant 22 is mixed to the solution of the gel-like material by stirring or tumbling, the reactant 22 can be dispersed almost uniformly in the carrier of the gel-like material 23. When the oil is in contact with the hydrophilic layer of the gel, the certain component of the oil such as acidic ions is adsorbed by the reactant through the hydrophilic layer of the gel. Therefore, it is possible enough that the reactant held by the gel-like material 23 conducts the above adsorption reaction. The oil can pass through the gel-like material.

Herein, the second compound of the gel-like material 23 is further explained.

The solvent as the second compound can function as a reaction field to obtain the gel-like material which carries the reactant. As mentioned above, in case where the first compound is the reaction product of polydimethylaminoethyl methacrylate and a diamine compound which contains a fluorinated alkylsulfonyl group, one of the two kinds of compounds is first dissolved in the solvent, and thereafter, the other compound is dissolved in the solvent. Further, therein the hydrotalcite is added, and then it is heated to a given temperature. Thereby, the solution of the gel-like material which carries the hydrotalcite-like compound can be obtained. The reaction between the raw material compounds to obtain the reaction product as the first compound is a cross-linking reaction.

The solvent as the second compound may preferably be the amphiphilic solvent, and thus, can exhibit a function to enhance the reactivity of the hydrotalcite-like compound with the above acidic component. Since the hydrotalcite-like compound is disposed in the oil path, it is necessary for the compound to be stable at a temperature where the oil is used. Therefore, it is necessary that the gel-like material is not volatile at the temperature where the oil is used (First requirement). In addition, since water relates the acidic component as mentioned above, and tends to enhance the ability of adsorption of the hydrotalcite-like compound as mentioned bellow, it is necessary for the gel-like material to be compatible with water (water adsorpability) in the oil path in a certain or more degree (Second requirement).

According to the first requirement, the solvent contained in the gel-like material is desirably a high molecular weight compound rather than a low molecular weight compound. According to the second requirement, the solvent of the gel-like material desirably has a hydrophilic property in a certain or more degree. However, since it is required to have a certain compatibility with the above gel (organic high molecular weight compound) of the first compound, it is desirable that the solvent has both of a hydrophobic part in a certain degree and a hydrophilic part in a certain degree. Accordingly, the solvent may be an amphiphilic solvent having a certain high molecular weight and having the hydrophilic part and the hydrophobic part. However, after formation of the gel-like material, the amphiphilic solvent therein may be replaced by a hydrophilic solvent.

The gel-like member 24 may further include a holding member which is configured to further hold the gel-like material 23 composed of the first compound and the second compound to hold the reactant 22. The holding member may be an unwoven fabric member, etc., and for example, may be formed in the same manner as in the above first member 16 and the second member 18, and the above gel-like material may be held between them (gap). In this case, the reactant 22 can be held more firmly.

(Second Embodiment)

Figure 4:
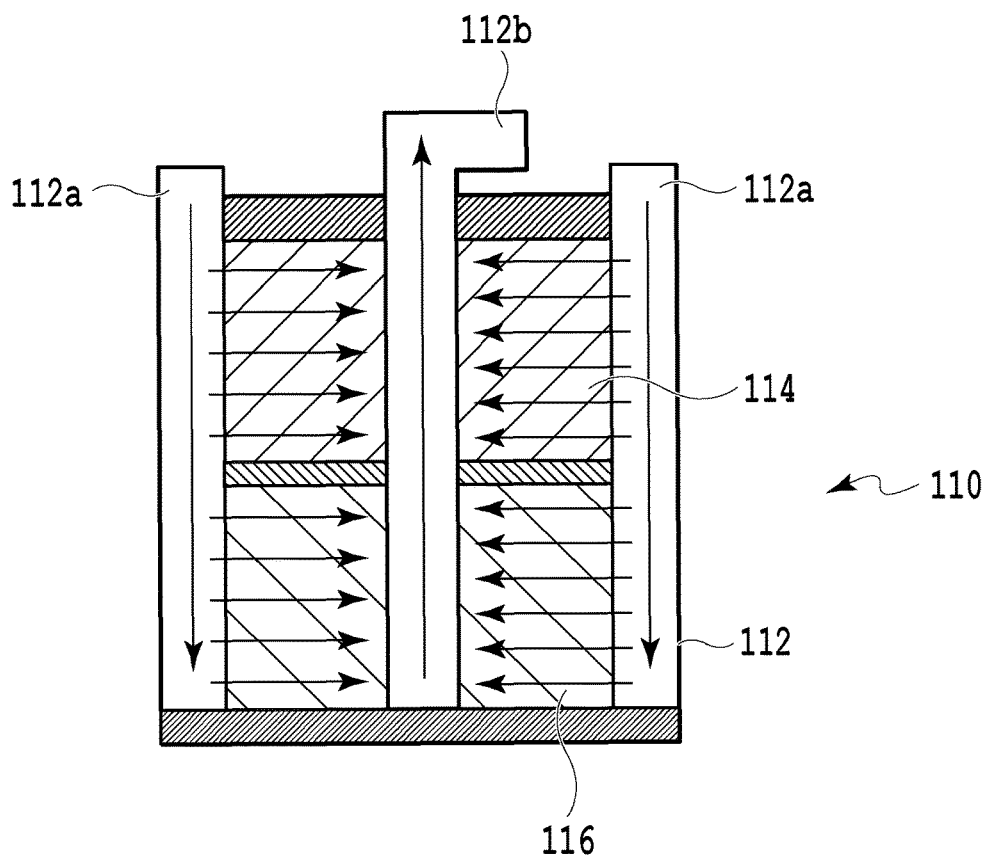
FIG. 4 is a schematic view of an oil filter according to a second embodiment of the present invention.

Next, the oil filter 110 according to the second embodiment of the present invention is explained. In FIG. 4, the oil filter 110 is shown schematically, and the flow of the oil is schematically represented by arrows. In this oil filter 110, there is employed the dead-end filtration system too.

The oil filter 110 is disposed in the oil path as in the oil filter 10. The oil filter 110 is provided with a casing 112, a first filter member 114 and a second filter member 116 which are held in the casing 112; the first filter member 114 having the configuration corresponding to the filter member 14 of the above oil filter 10, and the second filter member 116 configured as a conventional foreign matter filtering part, namely filter medium. The casing 112 has inlet ports 112a and an outlet port 112b. The number of the inlet ports 112a may be one or more. Also, the number of the outlet ports 112b may be one or more.

Herein the first filter member 114 is formed so as to have a cylindrical shape, and has the same configuration as the third member 20 of the filter member 14 according to the first embodiment. In the filter member 114, as mentioned above, the reactant is held in the gel-like material. The first filter member 114 may further have a holding member such as an unwoven fabric member as in the first member 16 and the second member 18 of the filter member 14 according to the first embodiment. Since the first filter member 114 has the same configuration as that of the above third member 20, further explanation thereof is omitted.

Herein the second filter member 116 is formed so as to have a cylindrical shape, and is configured as an unwoven fabric member as in the first member 16 and the second member 18 of the filter member 14 according to the first embodiment. The second member 116 is provided mainly in order to remove foreign matters in the oil physically.

The first filter member 114 and the second filter member 116 are arranged in parallel. Accordingly, the oil having flowed into the casing 112 from the inlet ports 112a flows into either of the first filter member 114 and the second filter member 116 from surroundings of the first filter member 114 and the second filter member 116, and then, through either thereof, flows out from the outlet port 112b.

In the oil filter 110 having such a configuration, preferably approximately one half of the oil having flowed into the oil filter 110 passes through the first filter member 114, and the remaining passes through the second filter member 116. Accordingly, as mentioned above, the acidic anion component in the oil can be suitably removed by the first filter member 114, and also the foreign matters in the oil can be suitably removed by the second filter member 116.

(Third Embodiment)

Figure 5:
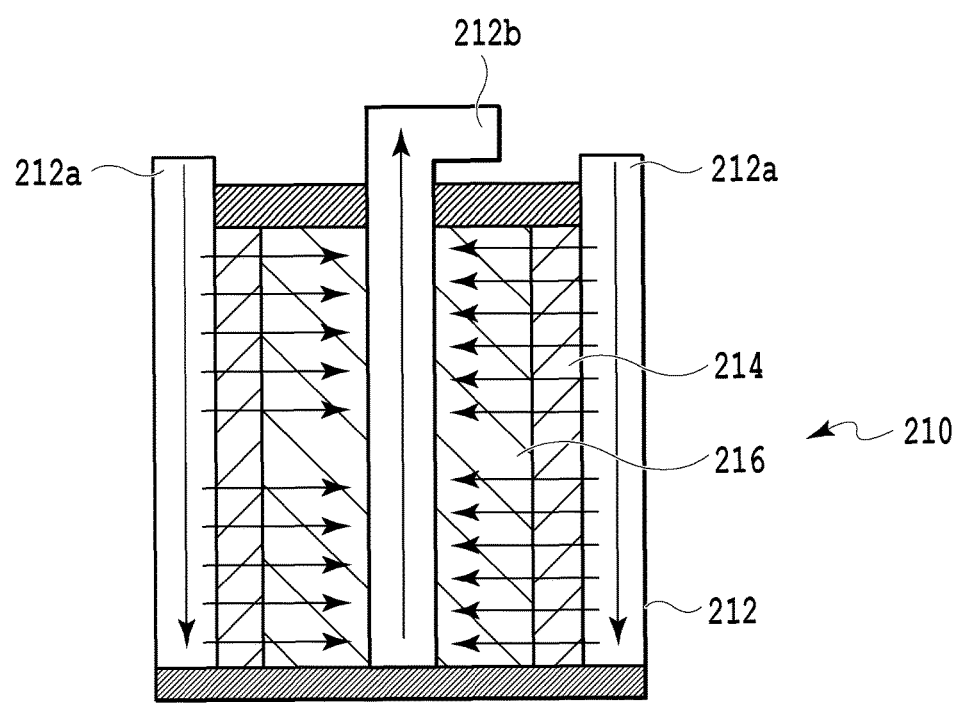
FIG. 5 is a schematic view of an oil filter according to a third embodiment of the present invention.

Next, an oil filter 210 according to the third embodiment of the present invention is explained. In FIG. 5, the oil filter 210 is shown schematically, and the flow directions of the oil are represented by arrows. In this oil filter 210, there is employed the dead-end filtration system too.

The oil filter 210 is different from the oil filter 110 of the second embodiment in the point that a first filter member 214 and a second filter member 216 are disposed in series. The first filter member 214 and the second filter member 216 of the embodiment have the same configuration as the first filter member 114 and the second filter member 116 in the second embodiment, but are different only in the form from their positional relation. Therefore, detailed explanation of the first filter member 214 and the second filter member 216 is omitted.

The first filter member 214 and the second filter member 216 are disposed in series, and are configured so that the cylindrical second filter member 216 is fitted in a hole inside the cylindrical first filter member 214.

According to the oil filter 210 having such a configuration, the oil having flowed into the oil filter 210 from the inlet port 212a of the casing 212 flows around the first filter member 214. Then after passing through the first filter member 214, the oil passes through the second filter member 216, and then flows out from the outlet port 212b. Accordingly, also by the oil filter 210, the acidic anion component in the oil can be suitably removed, and the foreign matters in the oil can be suitably removed.

The positional relation of the first filter member 214 and the second filter member 216 may be reversed. In this case, after passing through the second filter member 216, the oil passes through the first filter member 214.

(Fourth Embodiment)

Figure 6:
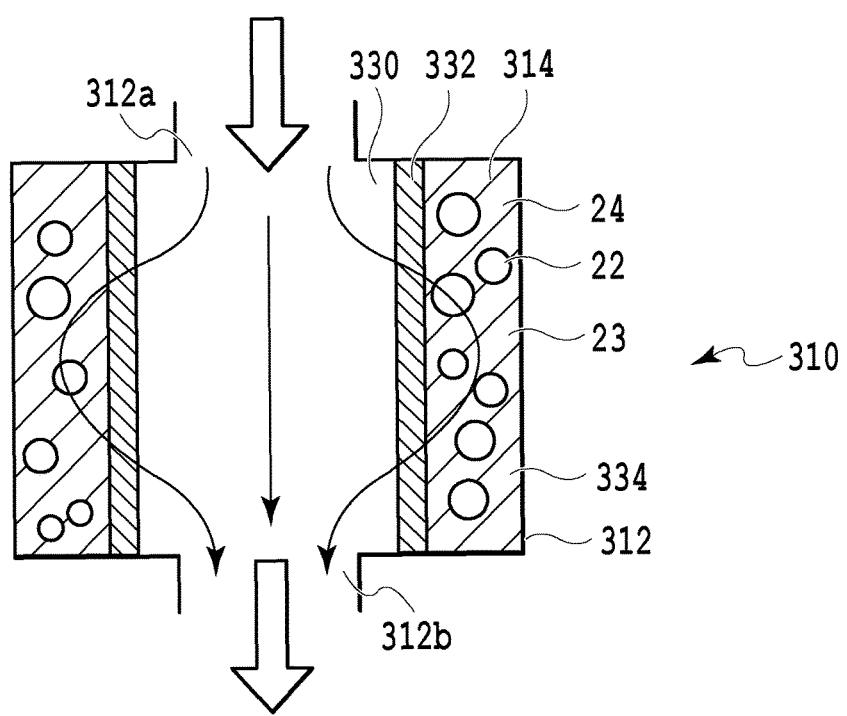
FIG. 6 is a schematic view of an oil filter according to a forth embodiment of the present invention.

Next, an oil filter 310 according to the fourth embodiment of the present invention is explained. In FIG. 6, the oil filter 310 is shown schematically, and the flow of the oil is schematically represented by arrows. In this oil filter 310, there is employed the tangential flow filtration system, different from the oil filter of the first to third embodiments.

The oil filter 310 is provided with a casing 312 and a filter member 314 disposed in the casing 312. The casing 312 has an inlet port 312a and an outlet port 312b.

The filter member 314 has a cylindrical inner member 332 which defines a through hole i.e. a flow path 330 passing through the center thereof, and a cylindrical outer member 334 which is disposed outside the inner member 332. The inner member 332 corresponds to the first member 16 or the second member 18 of the above first embodiment. The outer member 334 corresponds to the third member 20 of the above first embodiment. Therefore, the outer member 334 includes the gel-like member 24 which contains the reactant 22 and the gel-like material 23 which holds the reactant.

In this oil filter 310, the oil flows therein from the inlet port 312a and flows through the flow path 330. At that time, a part of the oil which is in contact with the filter member 314 flows so as to pass (bypass) in the filter member 314. Then, the oil flows out from the outlet port 312b. Thus, since a part of the oil having flowed into the oil filter 310 flows through the filter member 314, a given component in the oil, preferably acidic anion can be adsorbed and removed.

(Fifth Embodiment)

Figure 7:
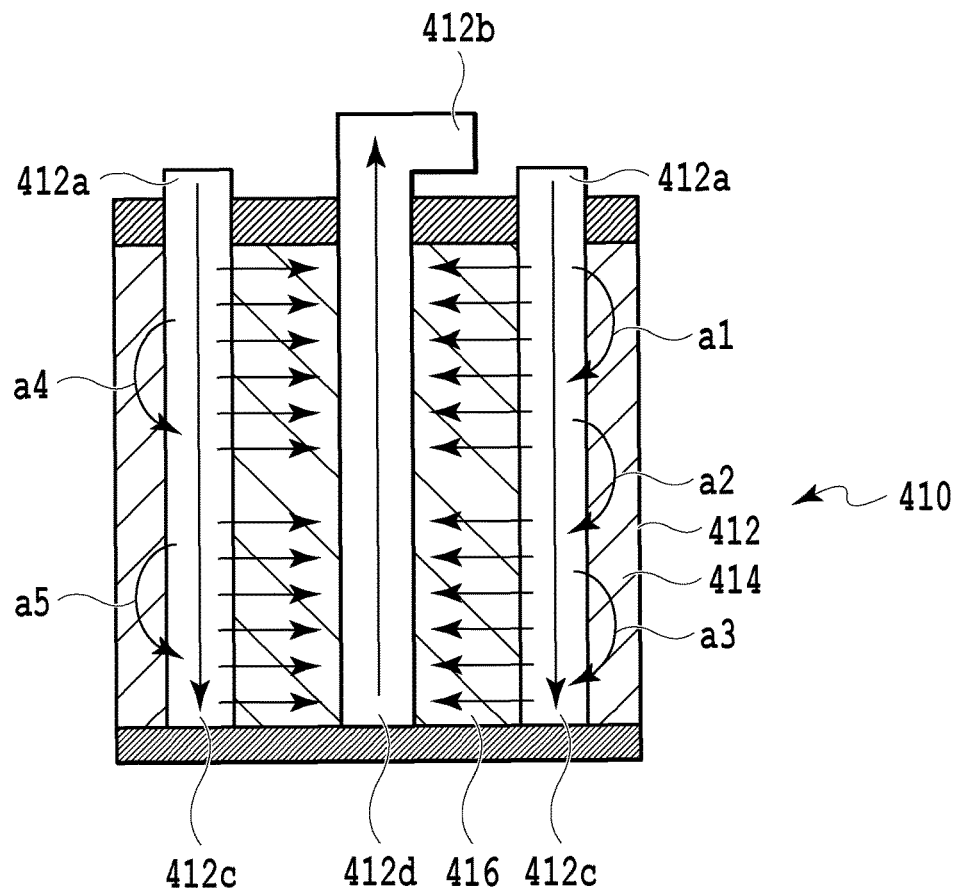
FIG. 7 is a schematic view of an oil filter according to a fifth embodiment of the present invention.

Next, an oil filter 410 according to the fifth embodiment of the present invention is explained. In FIG. 7, the oil filter 410 is shown schematically, and the flow of the oil is schematically represented by arrows. In this oil filter 410, there is employed the dead-end filtration system and also the tangential flow filtration system as in the oil filter 310 of the fourth embodiment is employed.

The oil filter 410 is provided with a first filter member 414 which is disposed so as to extend along the inner surface of a casing 412 and a second filter member 416 which is disposed in the center portion of the casing 412 apart from the first filter member 414. The first filter member 414 and the second filter member 416 of the embodiment have the same configuration as the first filter member 114 and the second filter member 116 in the second embodiment, but are different only in the form from their positional relation. Therefore, detailed explanation of the first filter member 414 and the second filter member 416 is omitted.

In the oil filter 410, an oil flow path 412c is formed between the first filter member 414 and the second filter member 416, and an inlet port 412a is connected to the oil flow path 412c. The oil flows from the inlet port 412a to the oil flow path 412c, and a part of the oil can flow so as to pass through the inside of the first filter member 414 in contact therewith (refer to the arrows a1, a2, a3, a4, a5). Then, the oil having flowed or not having flowed in the first filter member 414 passes through the second filter member 416 and flows out from an outlet port 412b via a central oil flow path 412d. Accordingly, also by the oil filter 410, the acidic anion component in the oil can be suitably removed, and the foreign matters in the oil can be suitably removed.

Figure 8:
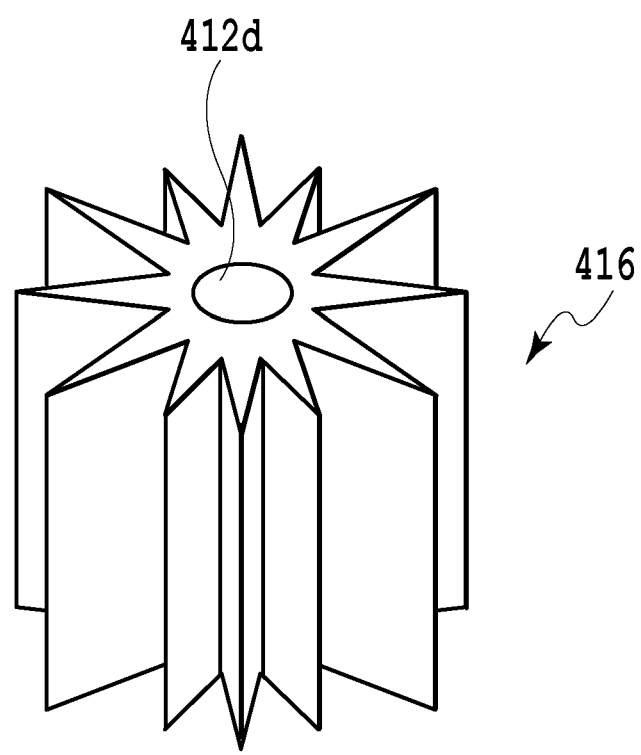
FIG. 8 is a schematic view of a second filter member in the oil filter shown in FIG. 7.

Since the first filter member 414 and the second filter member 416 are disposed separately from each other, the constraint in shape of each member is low in comparison with the other embodiments. As shown in FIG. 8, the second filter member 416 is formed so as to have the pleated structure. However, the second filter member 416 may have another structure.

In the following, examples relating to the present invention are explained.

EXAMPLE 1

A degraded oil was prepared, and its acid value was evaluated by subjecting it to the following tests. As the degraded oil, an engine oil (Castle (registered trademark) SL5W30 available from Toyota Motor Corporation) after driving 500 cycles (corresponding to running distance 30000 km) according to the urban running pattern of the internal combustion engine for testing was used. The acid value is determined by JIS K 2501. The measurement was conducted on the basis of the measurement method of neutralization number.

Figure 9:
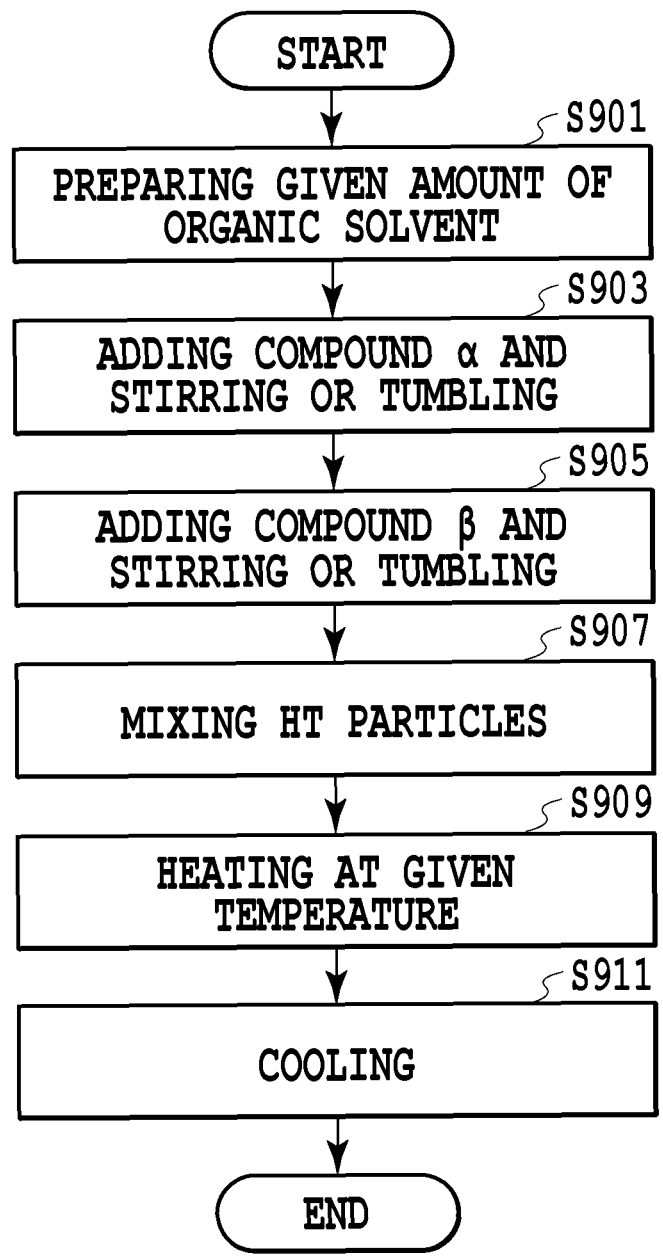
FIG. 9 is a diagram showing a procedure of producing a gel-like material which contains a hydrotalcite-like compound.

In the instant experiment, an oil filter with a gel-like material which contained hydrotalcite-like compound (gel-like member) which was produced according to the procedure explained in the following referring to FIG. 9 was used.

Firstly, a given amount of an organic solvent was prepared in a prepared vessel (Step S901). As the vessel, a vessel of 20 mL was used, and 5 mL of polyethylene glycol dimethyl ether (available from TOHO Chemical) was introduced thereto as the organic solvent. As the organic solvent, for example, polyethylene glycol monomethyl ether (available from TOHO Chemical) may be used.

To the organic solvent in the vessel, 0.5 g of a compound α was added and stirred (Step S903). As the compound α, a toluene solution of polydimethylaminoethyl metacrylate (available from KANTO Chemical) was used. The stirring after adding the compound α was continued until the compound α was completely dissolved.

After the compound α was completely dissolved, 0.5 g of a compound β was further added and stirred (Step S905). As the compound β, N,N,N',N'-tetra(trifluoromethanesulfonyl) octane-1,12-diamine (available from KANTO Chemical) was used. The stirring after adding the compound β was continued until the compound β was completely dissolved.

After the compound β was dissolved completely, hydrotalcite-like compound (HT) particles ($Mg_6Al_2(OH)_{16}(CO_3)$: available from Wako Pure Chemical Industries, Ltd., particle size: about 3 to 100 μm) was further added to the solution in an amount of 4 g (oil:HT particles=approximately 500:1 (wt. %)) and stirred (Step S907). The mixing was carried out until the HT particles were completely immersed so as to be embedded completely in the solution at the time of standstill. The HT particles may be added more.

Figure 10:
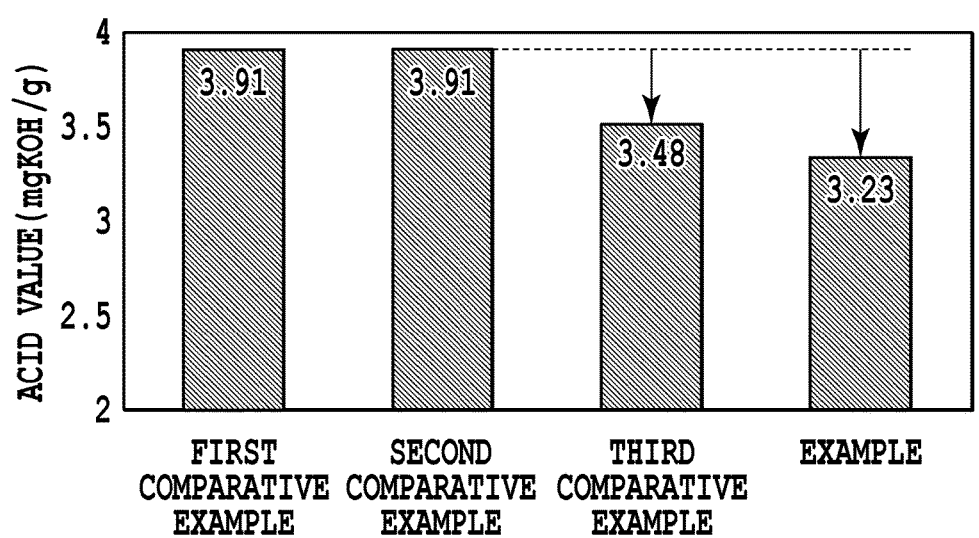
FIG. 10 is a graph showing an experimental result of Example 1.

Then, the solution which contained the HT particles was heated at a given temperature (85° C. to 95° C.) for a given period of time (preferably two hours or more) (Step S909), and then was cooled (Step S911) to produce the gel-like material which contained the HT particles. The oil filter was prepared by incorporating the gel-like material which contained the HT particles. The degraded oil to which water was added in an amount of 0.05 wt. % (the water content of the oil (containing water), hereinafter the same) was passed through the filter once, and thereafter the acid value of the degraded oil was measured. The evaluation results are shown in FIG. 10 as Examples. The reason why the small amount of water is added to the degraded oil is that water is generated in the internal combustion engine with the lapse of driving time, and the generated water may be introduced to the oil.

However, three comparative examples are shown in FIG. 10. The first Comparative Example shows the acid value of the aforementioned degraded oil itself almost without water content. The second Comparative Example shows the acid value of the degraded oil when the degraded oil to which water was added in an amount of 0.05 wt. % was passed once through the oil filter which was produced by simply mixing the above HT particles to the unwoven fabric member in a given amount (oil:HT particles=500:1 (wt. %)). The third Comparative Example shows the acid value of the degraded oil when the degraded oil to which water was added in an amount of 1 wt. % was passed once through the same oil filter as that used in the second Comparative Example.

As a result of the comparison of the first to third Comparative Examples in FIG. 10, it has been found that the increasing of the acid value of the oil can be inhibited by the hydrotalcite-like compound, that is, as explained above, it is possible to remove the acidic anion component from the oil. It is understood that in case that water exists, the increasing of the acid value can be effectively inhibited by hydrotalcite-like compound in comparison with the case that water is absent.

The acid value of the instant Example is further lower than the acid values of the first to third Comparative Examples. From this fact, it is apparent that the removing effect of the acidic component by the HT particles is excellent in the instant Example. This is assumed that by holding the HT particles with the gel-like material more firmly, agglomeration of the particles is inhibited, and thereby the reactivity of the HT particles can be ensured sufficiently.

EXAMPLE 2

Figure 11:
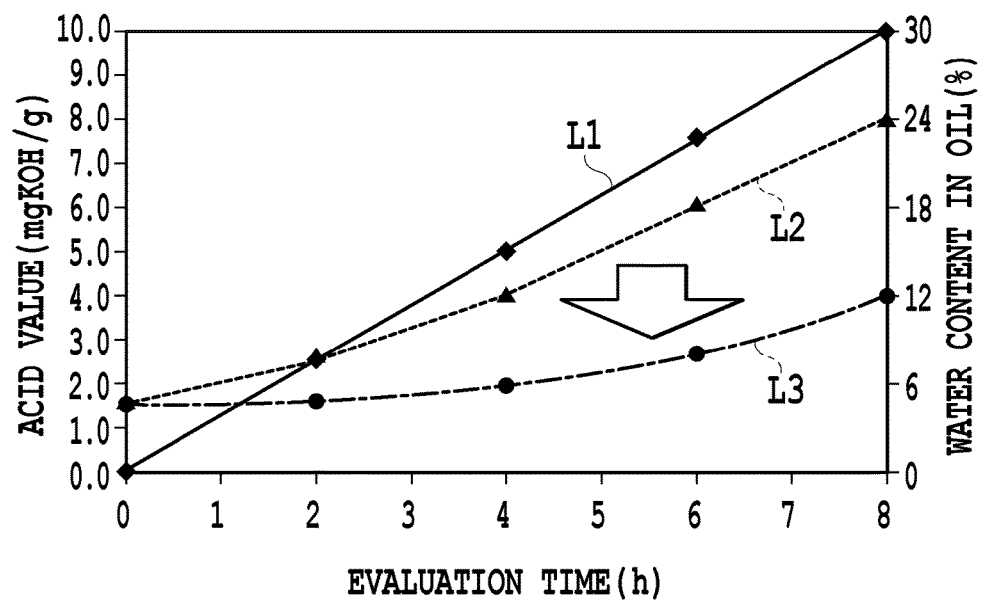
FIG. 11 is a graph showing an experimental result of Example 2.

Tests were further carried out. In the tests, as the engine oil, Castle (registered trademark) SL5W30 available from Toyota Motor Corporation was used. Under the condition where the driving condition of the engine trial system for testing was constant, sample oils were picked up from the system every two hours of continuous operation time, and a water content in oil and an acid value were measured. The results of the measurement are shown in FIG. 11. In FIG. 11, the water content in oil designated by a line L1 shows a ratio of weight of water to the weight of the sample oil (including water). In FIG. 11, the acid value designated by a line L2 is the result of Comparative Example, and is the result of the case where the oil filter which includes only the above HT particles in a given amount (oil:HT particles=approximately 500:1 (wt. %)) was disposed in the oil path. In FIG. 11, the acid value designated by a line L3 is the result of the instant Example, and is the result of the case where the oil filter carried the HT particles in the same amount as in the Comparative Example on the gel-like material produced by the same manner as in Example 1 according to the procedure explained in Example 1 was disposed in the oil path. The acid value was measured on the basis of the measurement method of neutralization number defined in JIS K 2501.

As is apparent from FIG. 11, as a result of entering water which was generated by combustion reaction of fuel, etc., the water content in oil was increased with the lapse of the operation time. In a usual engine, the increase of water content in oil is inhibited at a certain level due to water evaporation, but the system of the test is configured so that the generated water is maintained.

As is apparent from the comparison of the line L2 with the line L3 in FIG. 11, in the system with the oil filter of the instant Example which includes the gel-like material, the acid value is gradually increased with the lapse of time in comparison with the system with the oil filter of the Comparative Example which does not include any gel-like material. This is assumed because the agglomeration of the HT particles is inhibited by the gel-like material and the reaction of the HT particles with the acidic component in the oil is accelerated.

In the above, the present invention was explained on the basis of the above embodiments, modifications thereof and Examples. However, the present invention is not limited to those embodiments, and the like, and may include other embodiments. The present invention includes any modified examples, application examples and equivalents which are defined by the scope of the claims and included in the concept of the present invention.

The invention claimed is:

1. An oil degradation suppressor comprising:
   a reactant which has an ability to adsorb certain components in an oil; and
   a gel-like material for holding the reactant and comprising a gel having high heat resistance and an amphiphilic solvent, wherein
   the gel having high heat resistance is resistive to more than 130° C., and is a reaction product of polydimethylaminoethyl methacrylate and a diamine compound which contains a fluorinated alkylsulfonyl group; and
   the amphiphilic solvent is at least one selected from the group consisting of triethylene glycol dimethyl ether, diethylene glycol monomethyl ether, dipropylene glycol dimethyl ether, diethylene glycol dibutyl ether, diethylene glycol butyl methyl ether, diethylene glycol dimethyl ether, diethylene glycol ethyl methyl ether, dipropylene glycol monomethyl ether, diethylene glycol diethyl ether, tripropylene glycol dimethyl ether, diethylene glycol monobutyl ether, ethylene glycol monophenyl ether, triethylene glycol monomethyl ether, triethylene glycol butyl methyl ether, polyethylene glycol dimethyl ether, tetraethylene glycol dimethyl ether, polyethylene glycol monomethyl ether, and an ionic liquid.

2. The oil degradation suppressor according to claim 1, further comprising:
   a casing; and
   a filter component arranged in the casing, wherein
   the filter component comprises a gel-like component containing the reactant and the gel-like material;
   wherein the filter component is arranged so as to have one of a cylindrical shape and a pleated structure.

3. The oil degradation suppressor according to claim 1, wherein the diamine compound which contains the fluorinated alkylsulfonyl group is N,N,N',N'-tetra(trifluoromethanesulfonyl)hexane-1,6-diamine, or N,N,N',N'-tetra(trifluoromethanesulfonyl)octane-1,12-diamine.

4. The oil degradation suppressor according to claim 1, wherein the ionic liquid is a compound which comprises:
   at least one cation selected from the group consisting of a 1-alkyl-3-methylimidazolium, an N-alkylpyridinium, a tetraalkylammonium, and a tetraalkylphosphonium; and
   at least one anion selected from the group consisting of $[PF_4]^-$, $[(CF_3SO_2)_2N]^-$, $[BR_1R_2R_3R_4]^-$, $[BF_4]^-$, $[CF_3SO_3]^-$, $[CH_3CO_2]^-$, $[CF_3CO_2]^-$, $[NO_3]^-$, $Br^-$, $Cl^-$, $I^-$, $[Al_3Cl_2]^-$, and $[AlCl_4]^-$.

5. The oil degradation suppressor according to claim 1, comprising a hydrotalcite-like compound as the reactant.

* * * * *